United States Patent
Nakamura et al.

(10) Patent No.: US 7,225,914 B2
(45) Date of Patent: Jun. 5, 2007

(54) TRANSFER APPARATUS FOR TRANSFERRING BODY SIDE OF AUTOMOTIVE VEHICLE AND TRANSFER METHOD THEREOF

(75) Inventors: Setsuo Nakamura, Kanagawa (JP); Kimihiro Nishimura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 235 days.

(21) Appl. No.: 11/001,094

(22) Filed: Dec. 2, 2004

(65) Prior Publication Data

US 2005/0121291 A1 Jun. 9, 2005

(30) Foreign Application Priority Data

Dec. 9, 2003 (JP) ............................. 2003-409755

(51) Int. Cl.
*B65G 37/00* (2006.01)
*B65G 17/12* (2006.01)

(52) U.S. Cl. ................ 198/465.4; 198/485.1; 198/803.14

(58) Field of Classification Search ............ 198/465.4, 198/485.1, 803.14
See application file for complete search history.

(56) References Cited

U.S. PATENT DOCUMENTS

| | | | |
|---|---|---|---|
| 4,462,315 A * | 7/1984 | Wakabayashi | ........... 104/172.4 |
| 4,475,462 A | 10/1984 | Tsumaki et al. | |
| 5,203,073 A | 4/1993 | Kotake et al. | |
| 5,364,469 A * | 11/1994 | Wakabayashi | .............. 118/423 |
| 6,374,993 B1 * | 4/2002 | Tetzloff | ...................... 198/682 |
| 6,766,894 B2 * | 7/2004 | Arai et al. | ............... 198/465.4 |
| 6,799,673 B2 * | 10/2004 | Kilabarda | ................ 198/465.4 |
| 6,814,219 B2 * | 11/2004 | Shimizu | ................ 198/465.4 |
| 6,966,431 B2 * | 11/2005 | Jaynes et al. | ................ 198/817 |

FOREIGN PATENT DOCUMENTS

| | | | |
|---|---|---|---|
| EP | 0 192 613 A3 | 8/1986 | |
| EP | 1 104 737 A1 | 6/2001 | |
| JP | 63166671 A * | 7/1988 | .............. 198/465.4 |
| JP | 2001-278140 A | 10/2001 | |
| JP | 2001310777 A * | 11/2001 | |

\* cited by examiner

*Primary Examiner*—Mark A. Deuble
(74) *Attorney, Agent, or Firm*—Foley & Lardner LLP

(57) ABSTRACT

A transfer apparatus for transferring a body side of an automotive vehicle which is supported so that a front-to-rear direction of the body side coincides with a transfer direction, includes a hanger having a plurality of support members for supporting a side sill lower portion, a rear pillar or its adjacent portion and an arch portion front side of a rear wheel house of the body side, respectively. The hanger is configured to support the body side in a posture inclining inboard of the automotive vehicle and declining toward a rear end of the body side hanger is further configured so that the body side is urged only by its own weight against the support members so as to be positioned and supported thereby. A transfer method for the body side is also provided.

16 Claims, 10 Drawing Sheets

TRANSFER APPARATUS FOR TRANSFERRING BODY SIDE OF AUTOMOTIVE VEHICLE AND TRANSFER METHOD THEREOF

BACKGROUND OF THE INVENTION

The present invention relates to a transfer apparatus for transferring a body side (body side panel) of an automotive vehicle while supporting the same by means of a hanger, along a predetermined transfer path in a vehicle body assembly line, i.e., a so-called overhead type body side transfer apparatus and more specifically to a body side transfer apparatus that can be widely used in transfer of body sides for various vehicle models or designs and in transfer of the body side in either of the forward facing posture in which the body side is transferred with its front side being positioned more forward than its rear side with respect to the transfer direction or in the rearward facing posture in which the body side is transferred with its rear side being positioned more forward than its front side with respect to the transfer direction, and furthermore that is simple in structure while being capable of supporting the body side in a predetermined posture stably.

A transfer apparatus adapted to hang the body side by a hanger while clamping the same by a clamp mechanism that is driven by an actuator has been widely used for transfer of the body side of the automotive vehicle. On the other hand, a transfer apparatus configured to dispense with the clamp mechanism that requires an actuator while being capable of supporting the body side stably has been proposed as disclosed in Unexamined Japanese Patent Publication No. 2001-278140.

The body side transfer apparatus of the above-described publication has a support member for supporting the body side in a hang-down manner at a door opening portion upper edge that is located forward of a center pillar and a first positioning member abuttingly engageable with a front edge of the center pillar, an inclination member positioned rearward of the first positioning member and capable of inclining forward from its upstanding position and a second positioning member provided to the upper end of the inclination member for insertion into an opening provided to the rear side of the center pillar.

When the body side is suspended from the transfer apparatus, it turns about a support member so as to decline toward a rear end and the inclination member receives an inclination moment caused by inclination of the body side, thus causing the second positioning member to abut upon a corner portion at the front upper end of the opening portion to allow the center pillar to be held between the first and second positioning members thereby positioning the body side.

SUMMARY OF THE INVENTION

By such a conventional body side transfer apparatus, it becomes possible to simplify the structure due to disuse of the clamp mechanism that requires the actuator to be driven thereby. However, the second positioning member is adapted to perform its positioning function when it changes its inclination position within a particularly sized opening of the body side. Thus, in case of transfer of a body side for a different vehicle model or design, the transfer apparatus cannot be used unless at least the second positioning member is changed and therefore has a room for improvement in wide use of the transfer apparatus.

It is accordingly an object of the present invention to provide a transfer apparatus for transferring a body side of an automotive vehicle which is capable of positioning the body side three-dimensionally only by a plurality of support members that are stationarily held at fixed positions and supporting the body side stably and which can be widely used in transfer of body sides for any vehicle models or designs.

To achieve the above object, there is provided according to an aspect of the present invention provides an overhead type transfer apparatus for transferring a body side of an automotive vehicle which is supported so that a front-to-rear direction of the body side coincides with a transfer direction, comprising a hanger having a plurality of support members for supporting a side sill lower portion, a rear pillar or its adjacent portion and an arch portion front side of a rear wheel house of the body side, respectively, wherein the hanger is configured to support the body side in a posture inclining inboard of the automotive vehicle and declining toward a rear end of the body side, and wherein the hanger is configured so that the body side is urged only by its own weight against the support members so as to be positioned and supported thereby.

According to another aspect of the present invention, there is provided a transfer method for transferring a body side of an automotive vehicle by means of a transfer apparatus including a hanger having a plurality of support members for supporting a side sill lower portion, a rear pillar or its adjacent portion and an arch portion front side of a rear wheel house of the body side, respectively, the method comprising hanging the body side on the hanger in a way as to allow a front-to-rear direction of the body side to coincide with a transfer direction, positioning the body side vertically, horizontally and in a front-to-rear direction of the body side by means of the support members in a way as to allow the body side to assume a posture declining toward a rear end of the body side and inclining inboard of the automotive vehicle, and urging the body side by its own weight against the support members and thereby supporting the body side on the support members.

BRIEF DESCRIPTION OF THE DRAWINGS

FIGS. 4A and 4B are enlarged schematic views of important portions of the transfer apparatus of FIG. 1, for illustrating abutting engagement of a pad with a rear pillar or its adjacent portion of the body side, wherein FIG. 4B is a side view of FIG. 4A;

DESCRIPTION OF THE PREFERRED EMBODIMENTS

Figure 1:
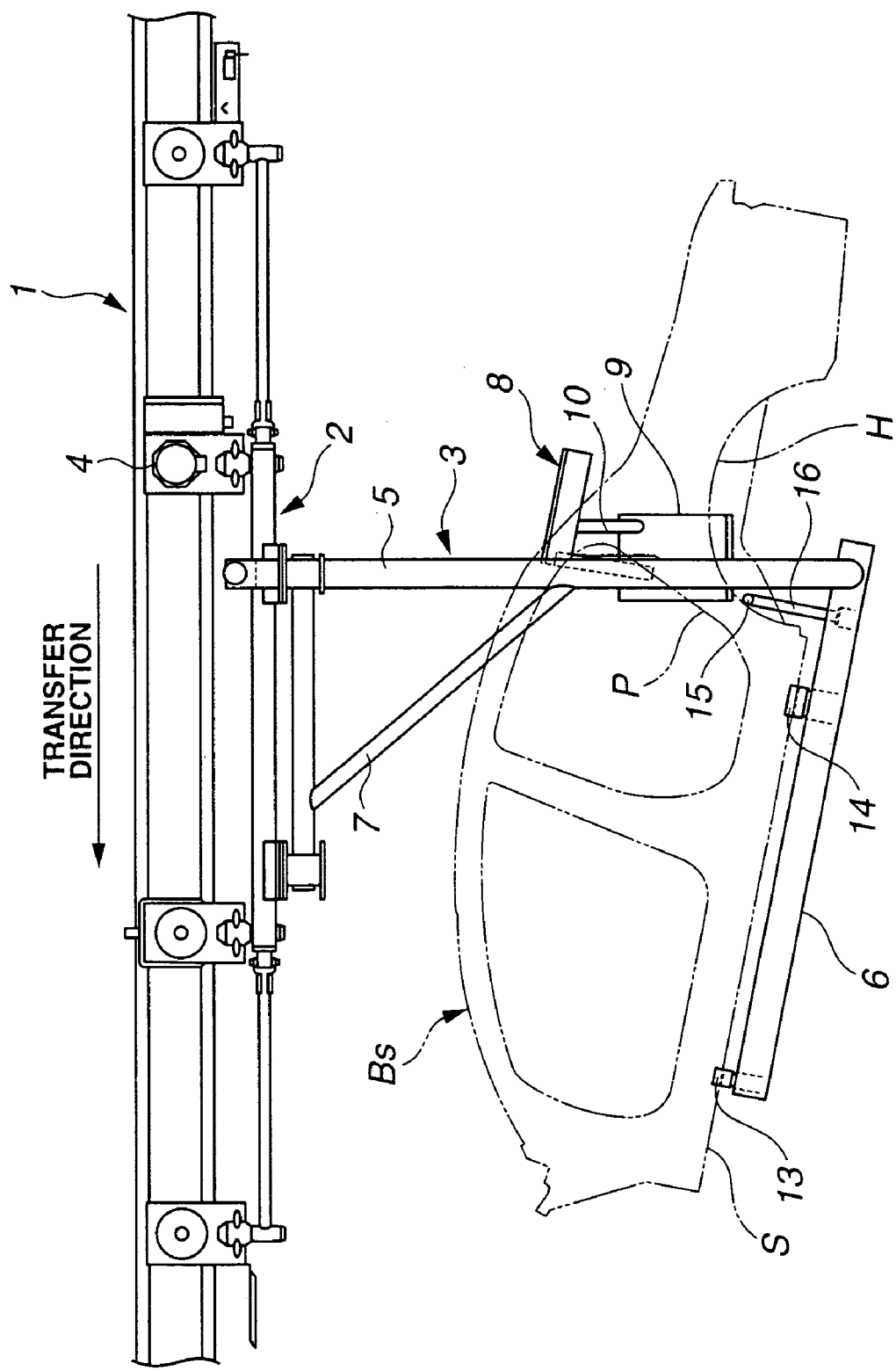
FIG. 1 is a schematic side view of a transfer apparatus for transferring a body side of an automotive vehicle according to an embodiment of the present invention.
Figure 2:
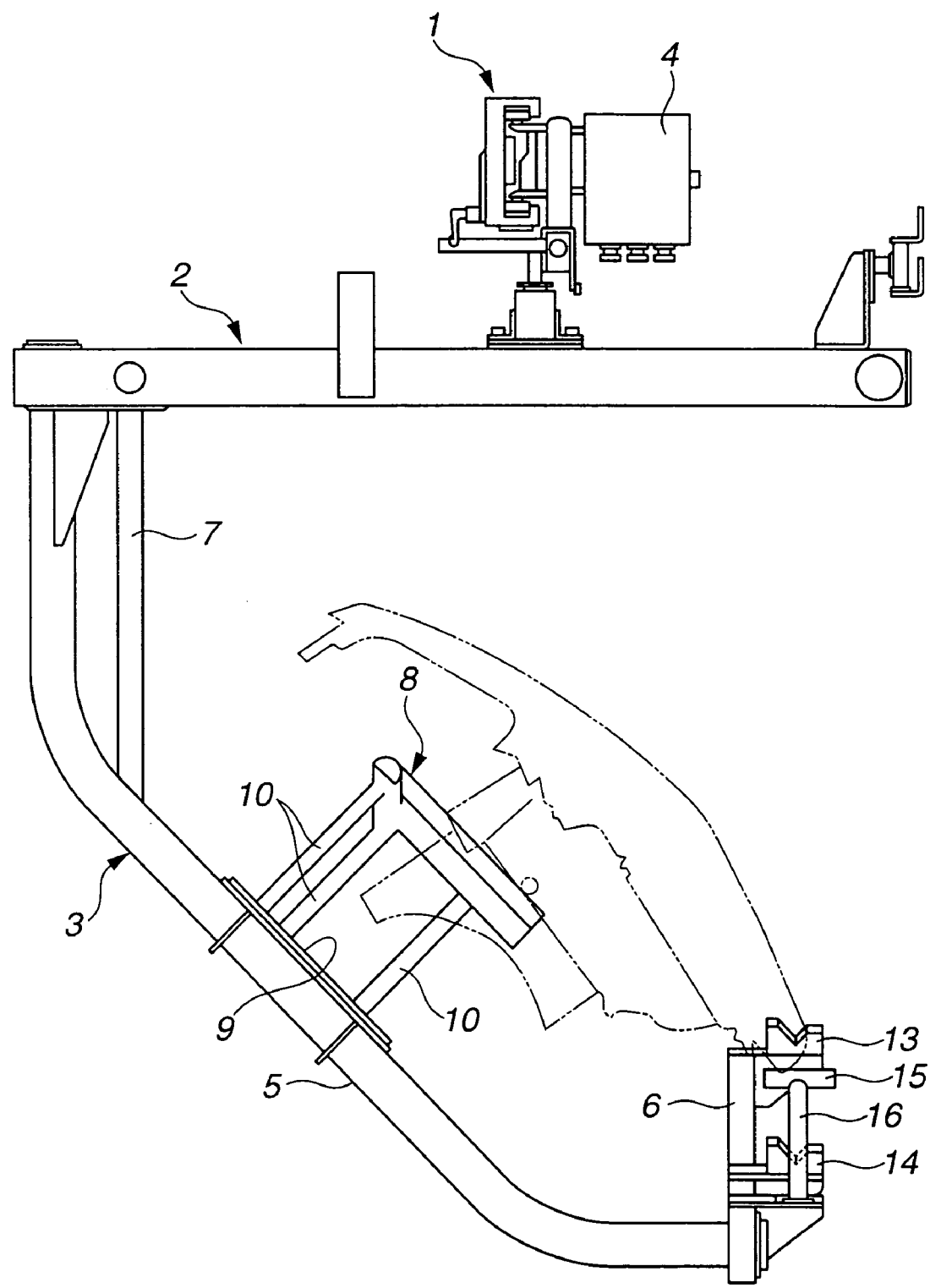
FIG. 2 is an enlarged schematic right-hand side view of the transfer apparatus of FIG. 1.
Figure 3:
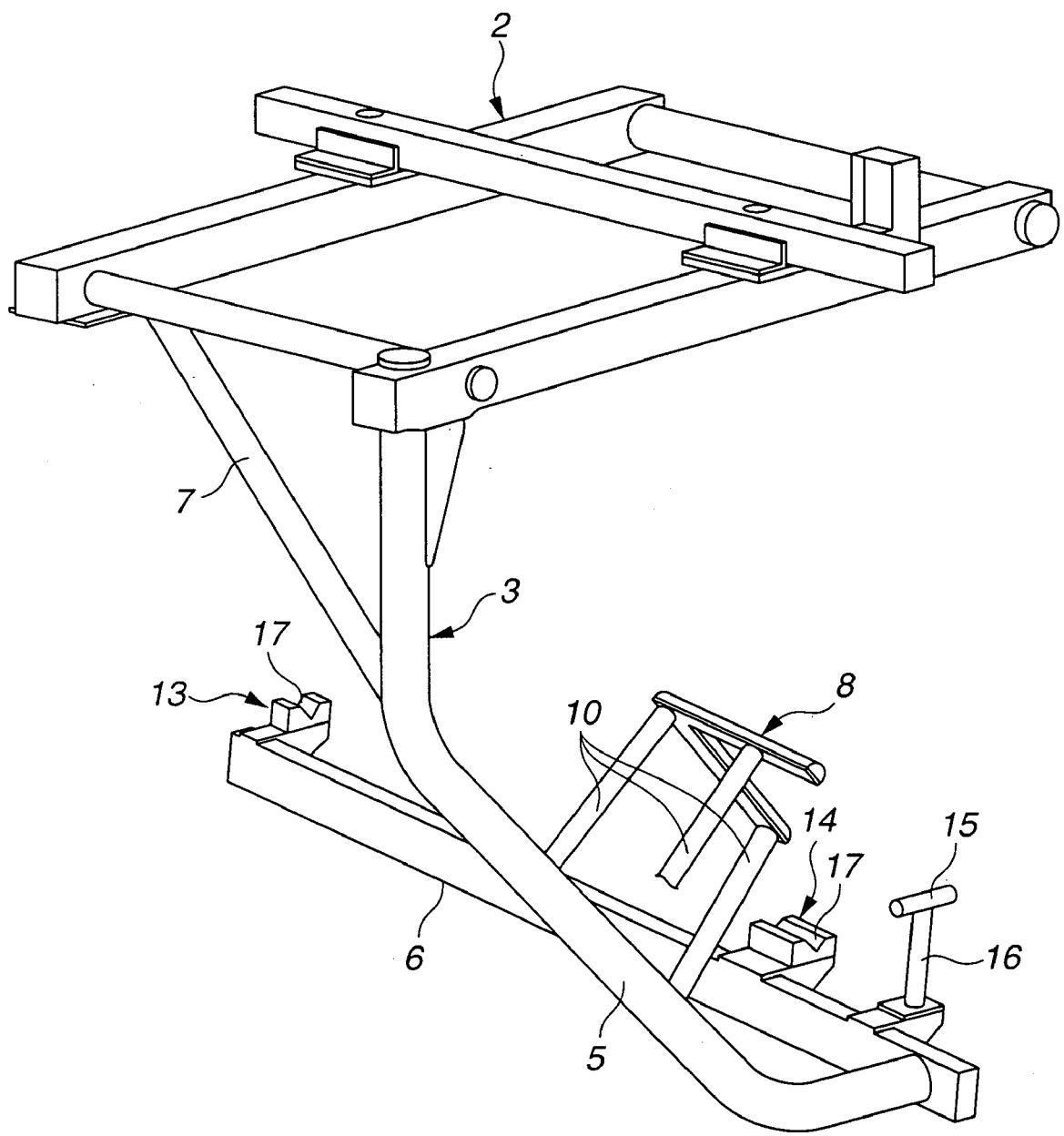
FIG. 3 is a perspective view of the transfer apparatus of FIG. 1.

Referring first to FIGS. 1 to 3, a transfer apparatus according to an embodiment of the present invention is constructed as a so-called train type overhead conveyer in which a body side is supported in a forward facing posture and transferred in the direction of the arrow in FIG. 1.

As shown in FIG. 1, from carriage 2 which moves along rail 1 is suspended hanger 3. Body side Bs of an automotive vehicle is supported on hanger 3 in a hang-down manner so as to be transferred or conveyed. In the meantime, body side Bs is supported on hanger 3 so that its front-to-rear direction coincides with the running direction of carriage 2 (i.e., transfer direction), while being supported at four positions in total, i.e., two front and rear support positions of a side sill S lower portion, a support position of rear pillar P or its adjacent portion and a support position of an arch portion front side of rear wheel house H and thereby positioned.

Carriage 2 is provided with motor 4 which is driven under supply of electric energy from a power supply track provided to rail 1. Motor 4 is adapted to drive a driving wheel (not shown) thereby enabling carriage 2 to be self-movable along rail 1.

Hanger 3 includes hanger frame 5 made of round pipe and supported on carriage 2 so as to hang down therefrom while curving like a fish hook, hanger bar 6 connected to a lower end of hanger frame 5 and elongated in the transfer direction while inclining upward, and reinforcement pipe 7 for reinforcing hanger frame 5.

Figure 4A:
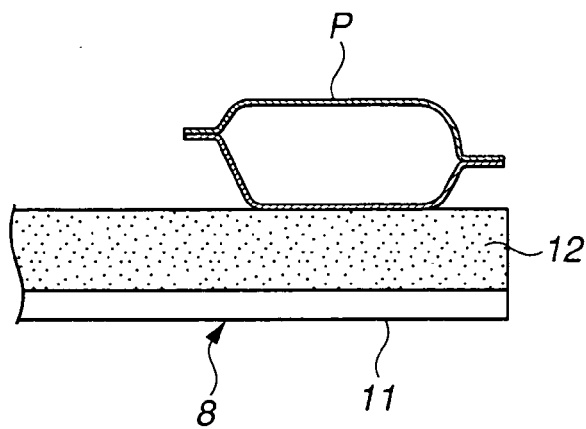
Figure 4B:
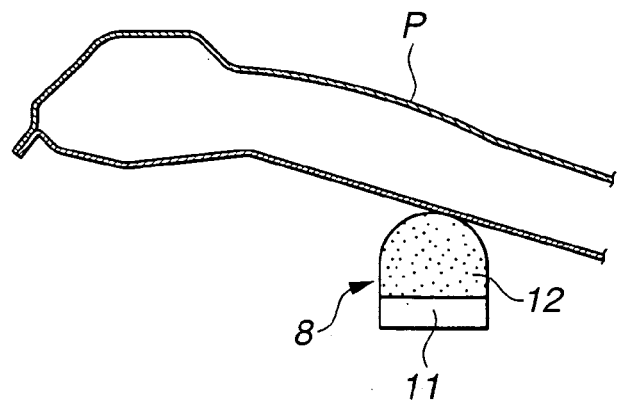

To an inclined portion of hanger frame 5 is provided pad 8 having a nearly L-shape that serves as a support member for supporting rear pillar P of body side Bs. Pad 8 is attached to the inclined portion of hanger 5 by means of attaching plate 9 and stays 10. As shown in FIGS. 4A and 4B, pad 8 consists of base plate section 11 in the form of a flat plate and seat pad section 12 disposed on base plate section 11. Seat pad section 11 is made of urethane and has a nearly semi-circular cross section. As will be apparent from FIG. 1, when body side Bs is supported on hanger 3 and positioned so as to assume a predetermined posture, a portion of rear pillar P of body side Bs or a roof side portion located above the portion of rear pillar P is supported by pad 8.

Pad 8 is adapted to support rear pillar P or its adjacent portion of body side Bs, which rear pillar P varies in shape relatively largely depending upon a variation in vehicle model or design. In order that pad 8 can support rear pillar P or its adjacent body side portion irrespective of a variation in vehicle model or design, it needs extend over a relatively wide area. For this reason, pad 8 is formed into a nearly L-shape so as to have a portion elongating in the front-to-rear direction and a portion elongating vertically.

On the other hand, hanger bar 6 in an inclined posture is provided with a pair of front and rear positioning blocks 13, 14 in the form of V-block that serve as support members for supporting the side sill S lower portion of body side Bs at two front and rear positions independently. Hanger bar 6 is also provided with end stopper 15 in the form of a round bar or post, which is attached thereto by way of stand 16. End stopper 15 is located adjacent one of the positioning blocks 14 and serves as a support member for abutting engagement with the arch portion front side of rear wheel house H.

Figure 5:
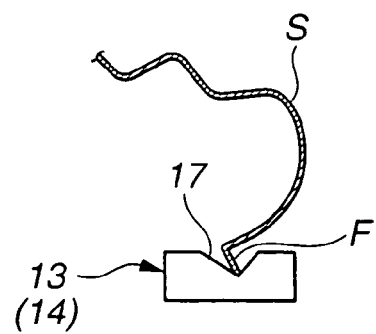
FIG. 5 is an enlarged schematic view of an important portion of the transfer apparatus of FIG. 1, for showing a positional relation between a positioning block and a side sill lower portion.

Positioning blocks 13, 14 for positioning of side sill S has, as shown in FIG. 5, V-groove 17 for receiving sill flange F of the side sill S lower portion whose variation in shape due to a difference in vehicle model or design is small. By receiving sill flange F of the side sill S lower portion by means of V-grooves 17 of the pair of front and rear positioning blocks 13, 14 provided to hanger bar 6 in an inclined posture, body side Bs suspended on hanger 3 is positioned at least vertically while assuming a posture declining toward a rear end of body side Bs.

Further, end stopper 15 is abuttingly engaged with the arch portion front side of rear wheel house H whose variation in shape due to a difference in vehicle model or design is relatively small. However, there occurs a small positional variation of the arch portion front side of rear wheel house H in the vehicle width direction due to a difference in vehicle model or design. To cope with such a small positional variation, end stopper 15 is formed into a round bar elongated axially in the vehicle width direction. As having been described above, end stopper 15 provided to hanger bar 6 is abuttingly engaged with the arch portion front side of rear wheel house H, whereby body side Bs suspended on hanger 3 is positioned at least vertically while assuming a posture declining toward the rear end of body side Bs.

In the meantime, in order that one kind of hanger can be used in transfer of different body sides for various vehicle models or designs, the support members are disposed at the positions common to a plural kinds of vehicle bodies or, in case the corresponding positions of the vehicle bodies are slightly different from each other, the support members are so sized as to cover all the corresponding positions.

By the body side transfer apparatus structured as above, when body side Bs is suspended on hanger 3, sill flange F of side sill S lower portion is received by V-grooves 17 of the pair of front and rear positioning blocks 13, 14 and positioned by the same, while at the same time pad 8 and end stopper 15 are abuttingly engaged with rear pillar P or its adjacent portion and the arch portion front side of rear wheel house H, respectively. More specifically, by inclining body side Bs inboard of the vehicle body thereby abuttingly engaging rear pillar P or its adjacent portion with pad 8, while receiving sill flange F of the side sill S lower portion with V-grooves 17 of positioning blocks 13, 14 thereby positioning Bs vertically, body side Bs is positioned horizontally or in the vehicle width direction through abutting engagement with pad 8 while assuming a posture inclined in the vehicle width direction. At the same time, body side Bs that is positioned on the basis of positioning blocks 13, 14 as described above, necessarily declines toward the rear end of body side Bs since hanger bar 6 itself to which positioning blocks 13, 14 are attached is declined backward or toward the rear end of body side Bs. By abuttingly engaging the arch portion front side of rear wheel house H of body side Bs with end stopper 15, body side Bs is positioned in the front-to-rear direction.

From the foregoing, body side Bs is positioned by its own weight with respect to hanger 3 having a plurality of support members that are stationarily held at fixed positions, three-dimensionally, i.e., in the vertical, front-to-rear and vehicle width or horizontal directions, without using any clamp mechanism or the like and thereby supported by hanger 3 stably. Body side Bs is transferred in the direction of the arrow indicated in FIG. 1 by self-running of carriage 2 while taking the posture facing forward and declined rearward.

Herein, it is supposed that body side Bs is moved out of position due to vibrations such as running vibrations during transfer. For example, body side Bs is moved vertically and in the vehicle width direction so as to be disengaged from positioning block 13, 14 or pad 8, or may cause a fluctuation phenomenon. However, since the weight of body side Bs in the posture declining toward the rear end of body side Bs acts in the direction to abuttingly engage body side Bs with end stopper 15, body side Bs returns immediately to its former condition by its self-correction function, i.e., to the condition where it is correctly engaged with positioning blocks 13, 14 and pad 8.

Similarly, there may possibly be caused a positional variation or fluctuation phenomenon with respect to the front-to-rear direction of body side Bs, in which the arch portion front side of rear wheel house H is moved away from end stopper 15. In this connection, since the weight of body side Bs in the posture declining toward the rear end of body side Bs acts in the direction to abutting engage body side Bs with end stopper 15, body side Bs returns soon to the former position by the self-correction function, i.e., to the condition where the arch portion front side of rear wheel house H is abuttingly engaged with end stopper 15.

Accordingly, at the time body side Bs is supported by a handling robot or the like transfer means after being transferred to a predetermined place, there is not caused any problem concerning the posture or position of body side Bs supported on hanger 3.

Further, as having been described as above, the side sill S lower portion and the arch portion front side of rear wheel house H whose variation in shape due to the difference in the vehicle model and design is relatively small, are supported by positional blocks 13, 14 and end stopper 15, whereas rear pillar P and its adjacent portion whose variation in shape due to the difference in the vehicle model or design cannot be disregarded are supported by pad 8 which is relatively large and long. Thus, in case, for example, body side Bs to be transferred is changed, or in case a plural kinds of body sides Bs are transferred in a mixed state, the body sides can be transferred successfully without the necessity of change in position and/or shape of pad 8, positioning blocks 13, 14 and end stopper 8, namely, a plural kinds of body sides Bs can be transferred without the necessity of setup or preparation.

In this connection, hanger 3 is detachable from carriage 2 and can be changed in the front-to-rear direction so as to face forward or rearward with respect to the transfer direction. By changing the direction of hanger 3 in this manner, the transfer apparatus can cope with transfer of body side Bs in the rearward facing posture as well as in the forward facing posture. In the meantime, the transfer mode of body side Bs in the rearward facing posture will be described in detail with respect to the second embodiment of FIG. 7.

Figure 6:
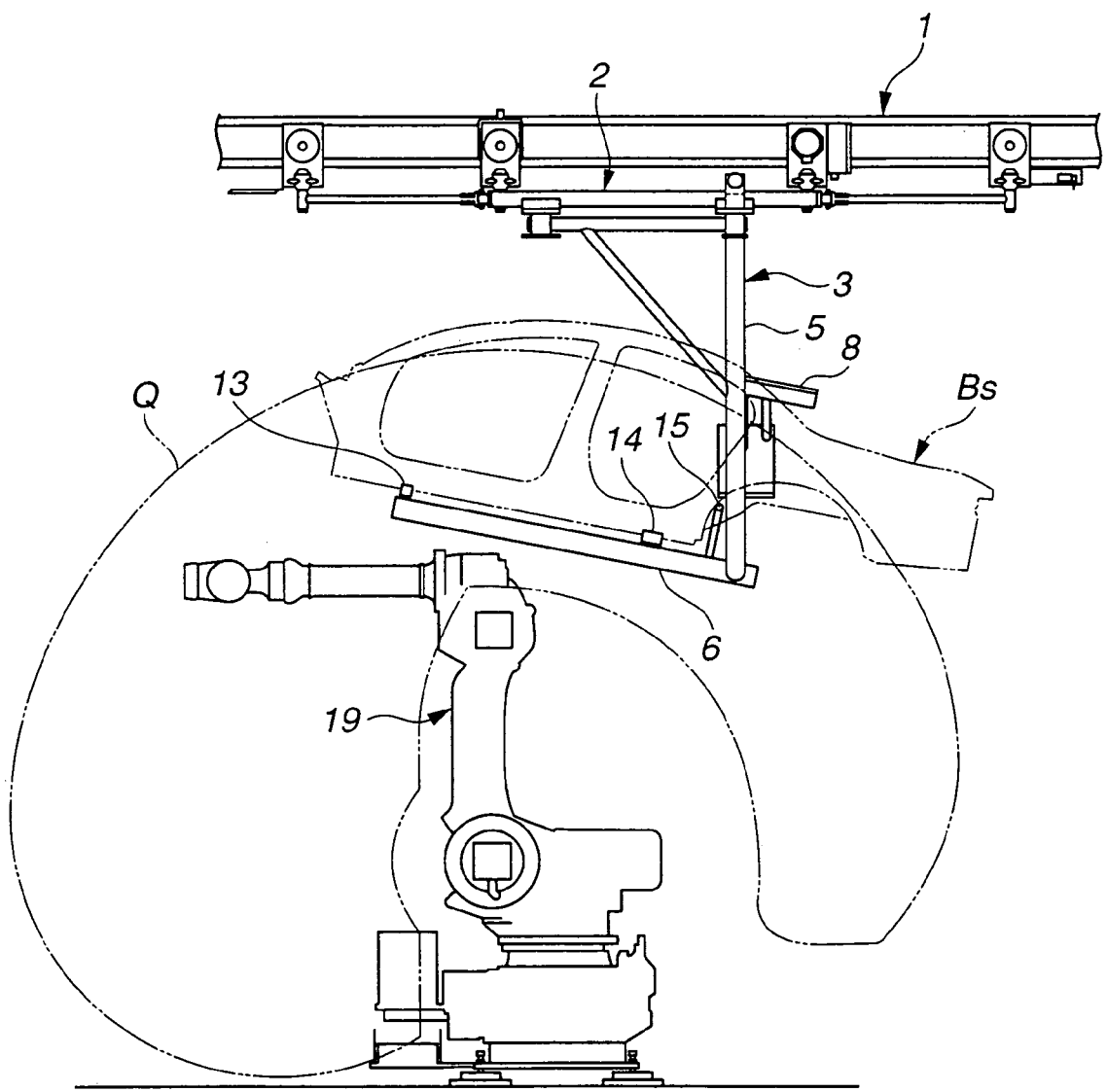
FIG. 6 is a schematic view showing a positional relation between the transfer apparatus of FIG. 1 and a handling robot.

FIG. 6 shows an example in which body side Bs having been transferred to a predetermined position by means of above-described hanger 3 is removed directly by handling robot 19. In the meantime, the robot hand is omitted for avoiding complexity in illustration.

As is apparent from the drawing, handling robot 19 having operation range Q is capable of approaching body side Bs supported on hanger 3 from either of the directions, i.e., from an outboard side or an inboard side by using its freedom.

Figure 7:
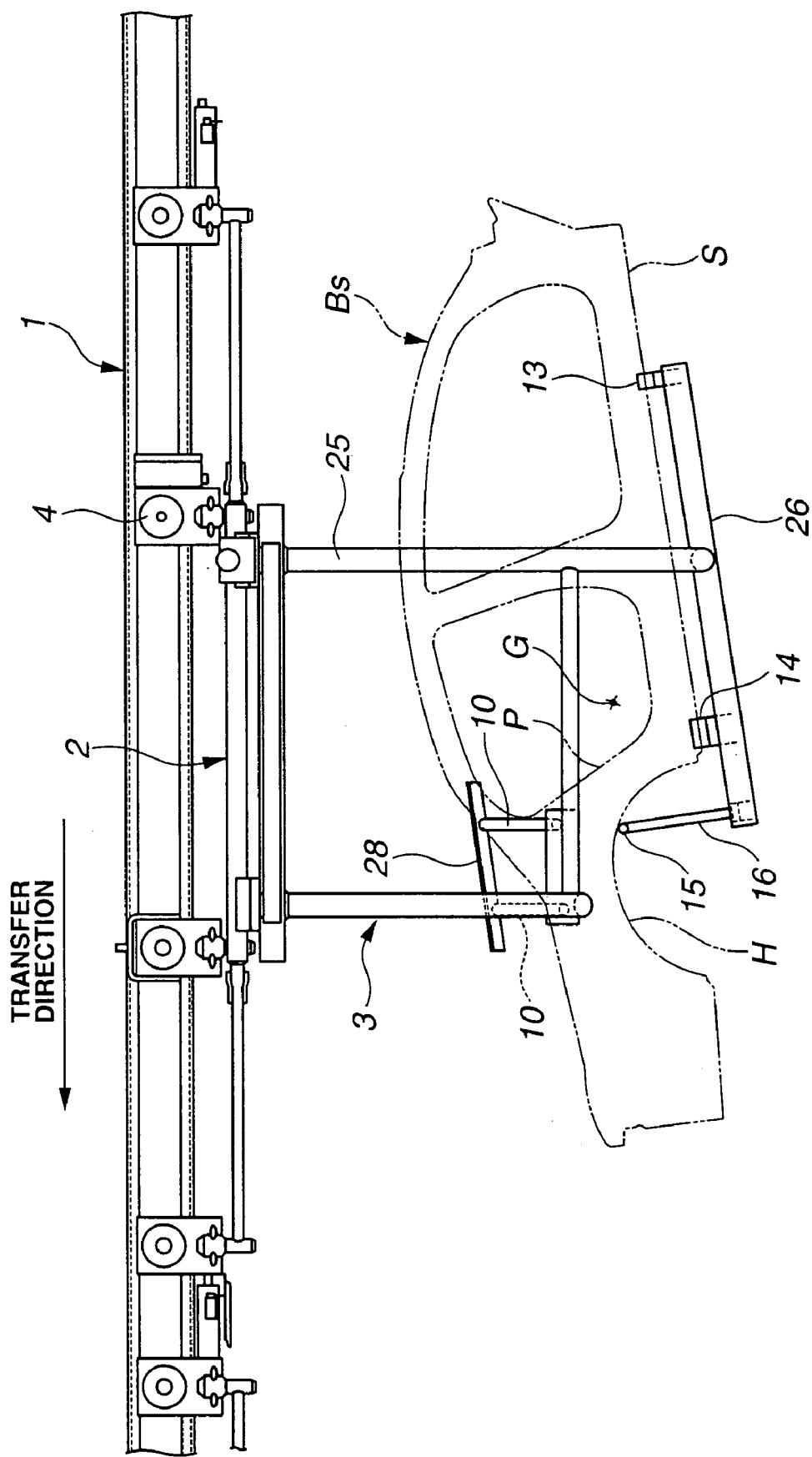
FIG. 7 is a view similar to FIG. 1 but shows a second embodiment.
Figure 8:
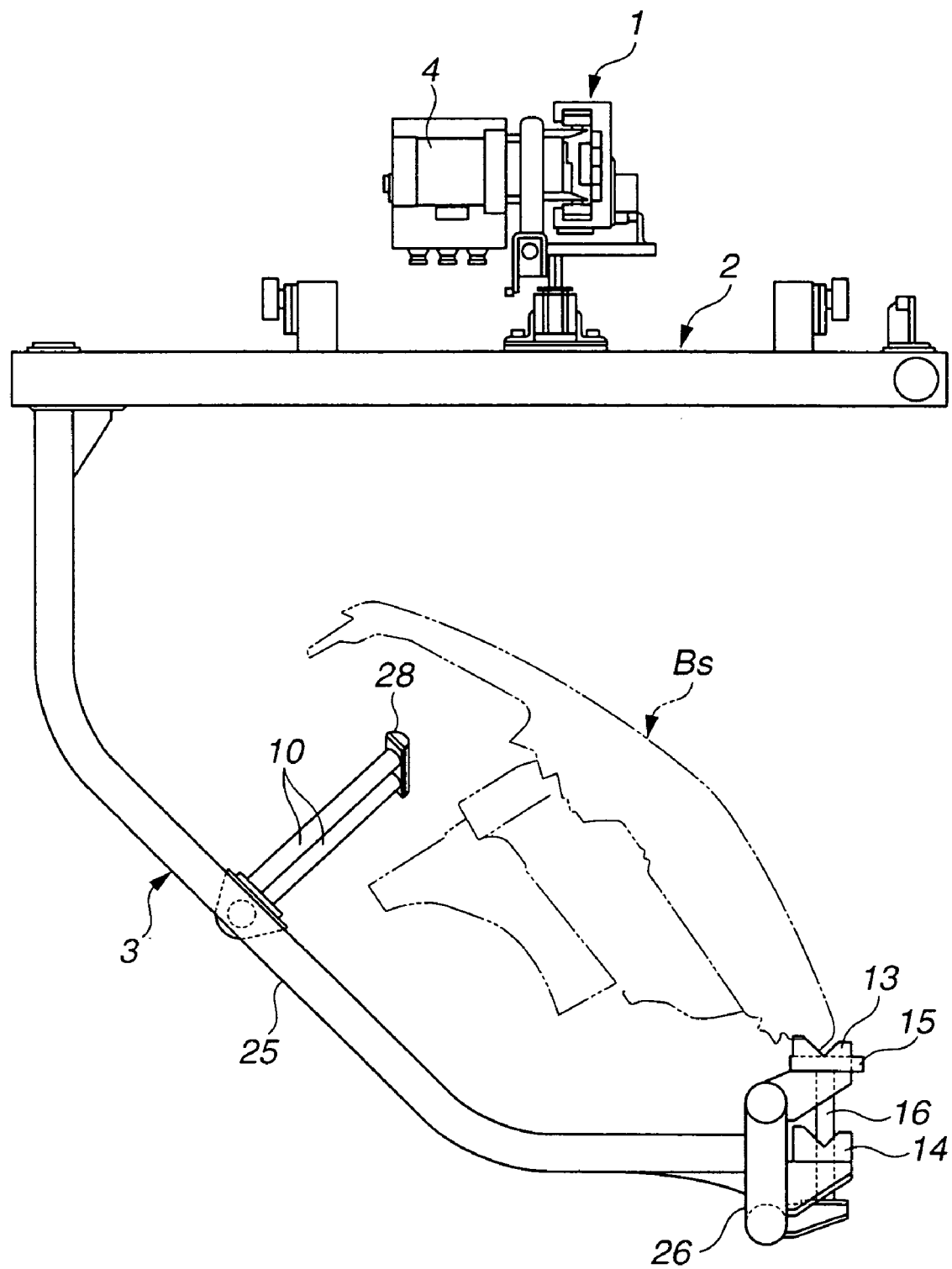
FIG. 8 is an enlarged schematic right-hand side view of the transfer apparatus of FIG. 7.
Figure 9:
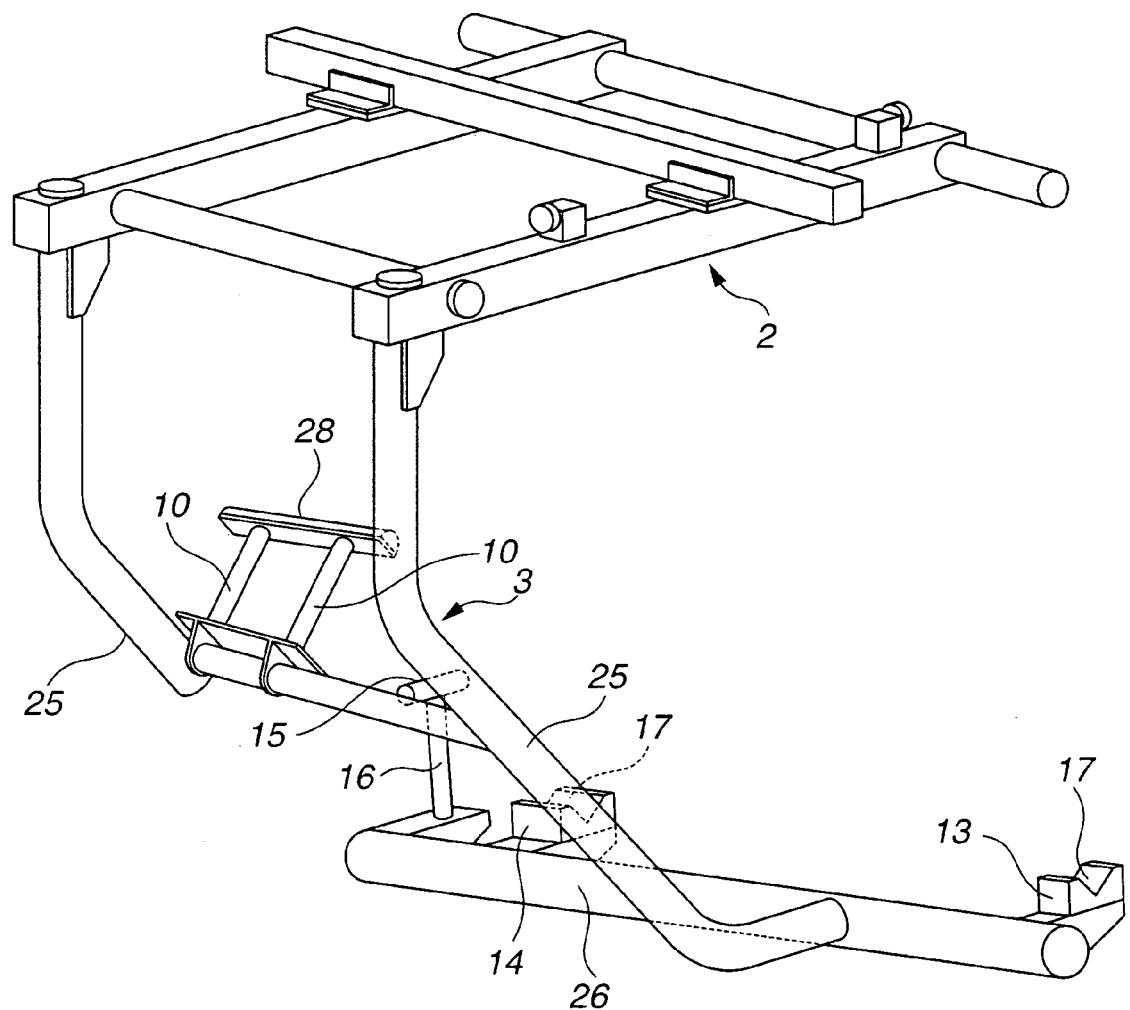
FIG. 9 is a perspective view of the transfer apparatus of FIG. 7.

FIGS. 7 to 9 shows a second embodiment in which like parts to those of the first embodiment are designated by like reference characters.

The second embodiment differs from the first embodiment in that body side Bs is transferred while assuming a rearward facing posture, and hanger frame 25 and pad 28 are different in shape from those of the first embodiment. Namely, hanger frame 25 has an upper portion that is formed from round pipes into a nearly rectangular shape and hanger bar 26 is also formed from round pipe. Pad 28 attached to hanger frame 25 by way of stays 10 is in the form of a straight bar extending in the front-to-rear direction of body side Bs.

As shown in FIG. 7, assuming that body side Bs to be transferred has a gravitational center G, it is determined that a horizontal distance between the gravitational center G and the support position (abutment position) of the arch portion front side of rear wheel house H by means of end stopper 15 is larger than a horizontal distance between the gravitational center G and the support position (abutment position) of the side sill S lower portion by rear side positioning block 14. Of course, in order to cope with transfer of a plural kinds of body sides Bs, setting is previously made so that the above-described relation is established with respect to all kinds of body side Bs. By this, even in the case where body side Bs is transferred in the rearward facing posture and even if the gravitational center G of a particular kind of body side Bs is located more rearward than the support position by rear side positioning block 14, body side Bs is not turned in the counter clockwise direction in FIG. 7 to be moved largely out of position by the impact caused by emergency stoppage of carriage 2.

Except for the above, the structure of the second embodiment is substantially the same as that of the first embodiment, so that the second embodiment can function substantially the same as the first embodiment.

FIGS. 10 to 13 shows variations of the second embodiment.

Figure 10:
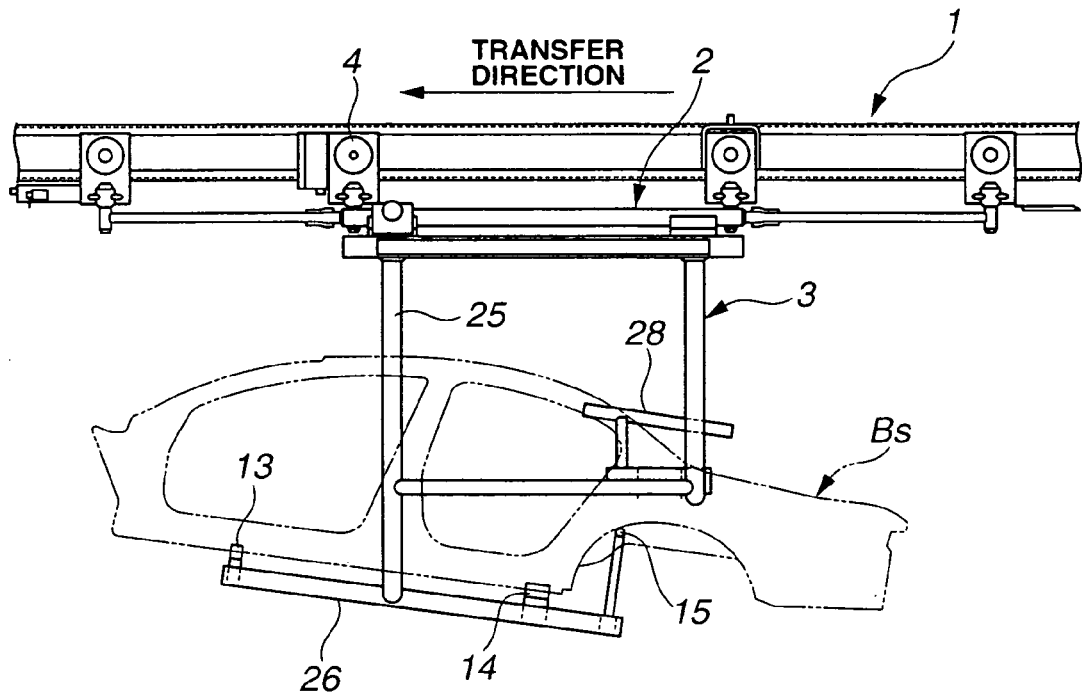
FIG. 10 shows a modification of the positional relation of FIG. 6.

FIG. 10 shows a variation in which hanger 3 is changed in its direction together with carriage 2 so that body side Bs of the same kind as that of FIG. 7 is changed in its transfer direction, i.e., body side Bs is transferred in the forward facing posture.

Figure 11:
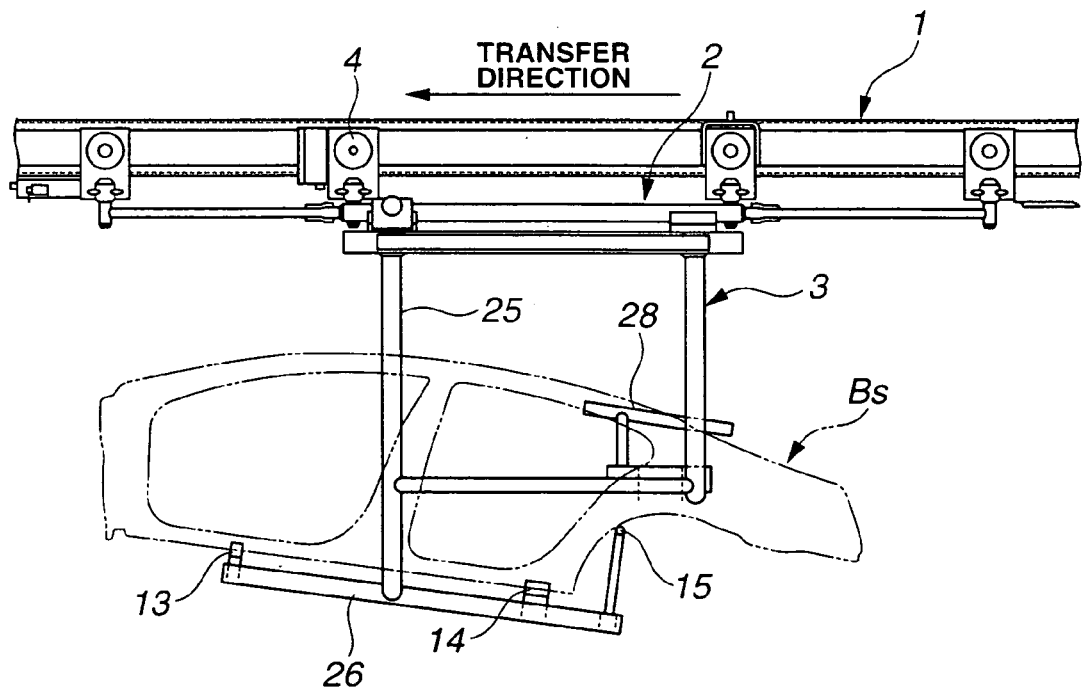
FIG. 11 illustrates transfer of a body side for a different vehicle model or design.
Figure 12:
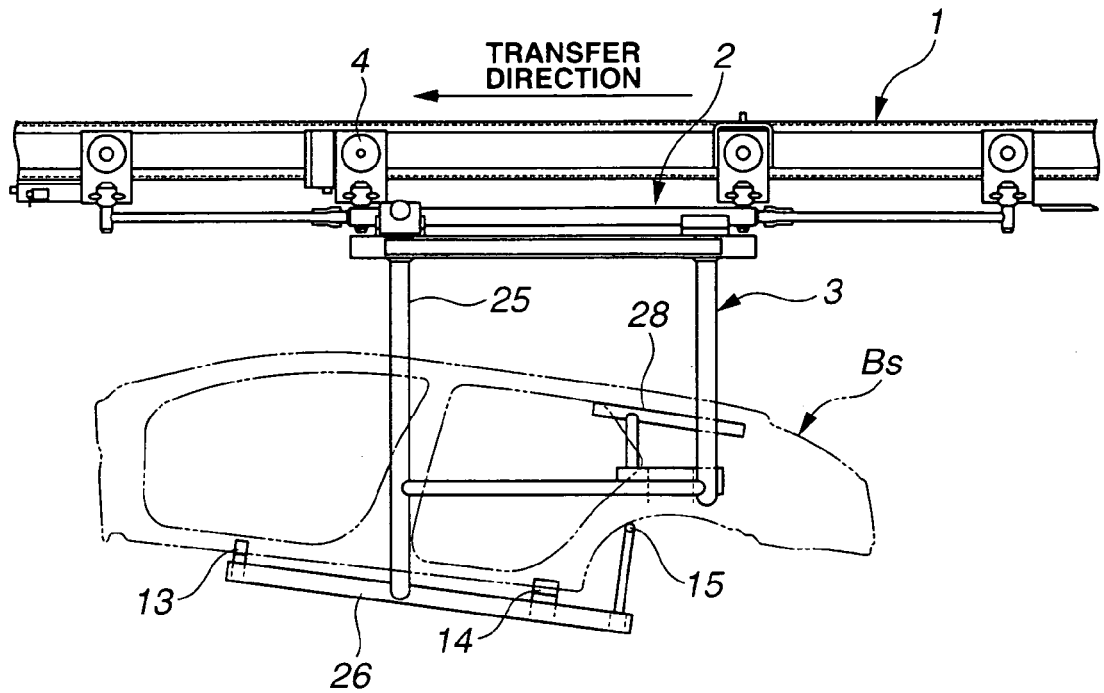
FIG. 12 illustrates transfer of a body side for another different vehicle model or design.
Figure 13:
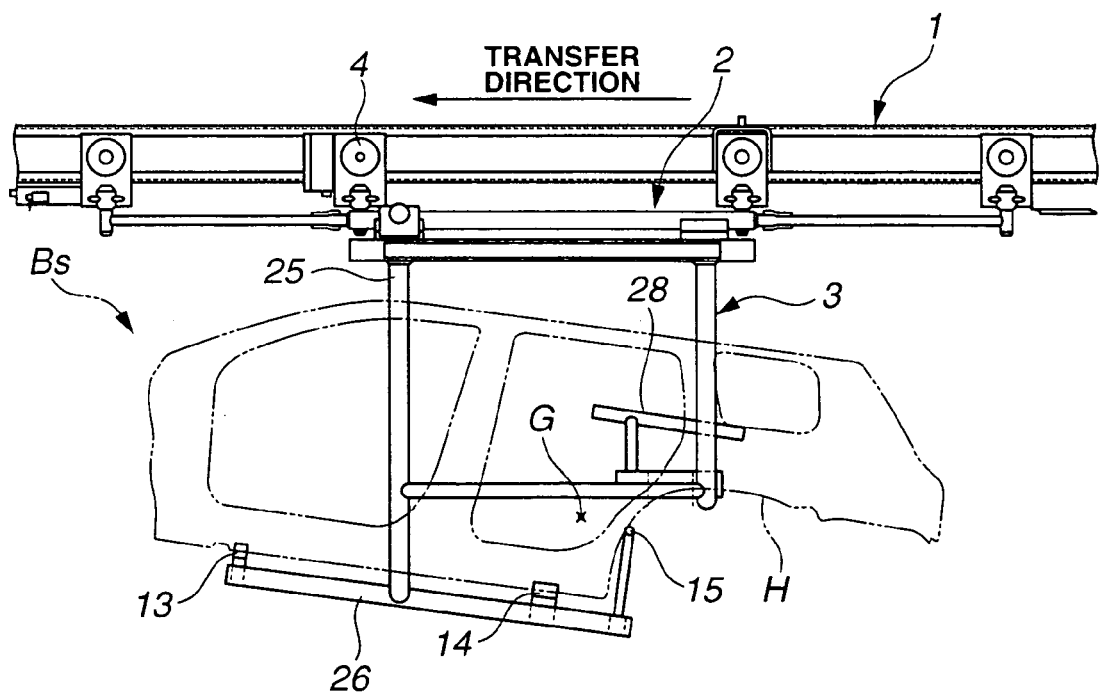
FIG. 13 illustrates transfer of a body side for a further different vehicle model or design.

FIGS. 11 to 13 shows variations in which body side Bs is transferred in the forward facing posture and changed in the vehicle model or design. FIG. 11 shows an example of body side Bs for a coupe type, FIG. 12 shows an example of body side Bs for a wagon type vehicle having a relative small height, and FIG. 13 shows an example of body side Bs for wagon type vehicle having a relatively large height. Particularly, in case of FIG. 13, the gravitational center G of body side Bs is located more rearward than the support position (abutment position) by rear side positioning block 14 at the side sill S lower portion, so that the relation between the gravitational center G and the support position (abutment position) by rear side positioning block 14 at the side sill S lower portion and the distance between the gravitational center G and the support position (abutment position) by end stopper 15 at the arch portion front side of rear wheel house H is of great importance.

Namely, by setting so that a horizontal distance between the gravitational center G and the support position (abutment position) by means of end stopper 15 at the arch portion front side of rear wheel house H is larger than a horizontal distance between the gravitational center G and the support position (abutment position) by means of rear side positioning block 14 at the side sill S lower portion, it becomes possible to prevent body side Bs from being turned in the clockwise direction in FIG. 13 when carriage 2 is suddenly stopped due to emergency stoppage or the like.

The entire contents of Japanese Patent Applications P2003-409755 (filed Dec. 9, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A combination of a body side of an automotive vehicle and an overhead type transfer apparatus for transferring the body side which is supported so that a front-to-rear direction of the body side coincides with a transfer direction of the body side, comprising:
a hanger having a plurality of support members;
wherein the body side includes a side sill lower portion, at least one of a rear pillar and an adjacent portion of the rear pillar, and a front side arch portion of a rear wheel house of the body side;
wherein the plurality of support members are adapted to support the side sill lower portion of the body side, the rear pillar or the adjacent portion of the rear pillar, and the front side arch portion of the rear wheel house of the body side, respectively;
wherein the hanger is adapted to support the body side in a posture inclining inboard of the body side and declining toward a rear end of the body side; and
wherein the hanger is adapted so that the body side is urged only by its own weight against the support members so as to be positioned and supported by the support members.

2. A combination of a body side of an automotive vehicle and an overhead type transfer apparatus according to claim 1, wherein two of the plurality of support members support the side sill lower portion at two front and rear support positions thereof, respectively.

3. A combination of a body side of an automotive vehicle and an overhead type transfer apparatus according to claim 2, wherein the hanger is configured so that a horizontal distance between a gravitational center of the body side and a support position at which the front side arch portion of the rear wheel house is supported by one of the plurality of support members is larger than a horizontal distance between the gravitational center and a rear support position of the side sill lower portion.

4. A combination of a body side of an automotive vehicle and an overhead type transfer apparatus according to claim 1, wherein the support member for supporting the rear pillar or adjacent portion of the rear pillar is elongated in the front-to-rear direction of the body side and has a curved abutment surface adapted for abutting engagement with the rear pillar or adjacent portion of the rear pillar of the body side.

5. A combination of a body side of an automotive vehicle and an overhead type transfer apparatus according to claim 4, wherein the support member for supporting the rear pillar or the adjacent portion of the rear pillar is formed into an L-shape and has a portion elongating in the front-to-rear direction of the body side and a portion elongating vertically.

6. A combination of a body side of an automotive vehicle and an overhead type transfer apparatus according to claim 1, wherein the support member for supporting the side sill lower portion has a positioning recess in the form of a V-groove adapted to receive a sill flange of the body side.

7. A combination of a body side of an automotive vehicle and an overhead type transfer apparatus according to claim 1, wherein the support member for supporting the front side arch portion of the rear wheel house is axially elongated in a vehicle width direction.

8. A combination of a body side of an automotive vehicle and an overhead type transfer apparatus according to claim 1, further comprising a self-running type carriage from which the hanger is suspended.

9. A combination of a body side of an automotive vehicle and a transfer apparatus for transferring a body side, comprising:
a hanger adapted to hang the body side to allow a front-to-rear direction of the body side to coincide with a transfer direction of an assembly line on which the hanger rides;
wherein the hanger includes a first positioning section adapted to position the body side vertically and supporting the body side in a posture declining toward a rear end of the body side, a second positioning section adapted to position the body side in a vehicle width direction and supporting the body side in a posture inclining inboard of the body side, and a third positioning section adapted to position the body side in the front-to-rear direction of the body side; and
wherein the body side is supported by its own weight on the first, second and third positioning sections.

10. A combination of a body side of an automotive vehicle and an transfer apparatus according to claim 9, wherein the first positioning section includes two first support members adapted to support a side sill lower portion of the body side at two front and rear support positions thereof, wherein the second positioning section includes a second support member adapted to support a rear pillar or an adjacent portion of the rear pillar of the body side and wherein the third positioning section includes a third support member adapted to support on a front side arch portion of a rear wheel house of the body side.

11. A combination of a body side of an automotive vehicle and an overhead type transfer apparatus according to claim 10, wherein the hanger is adapted such that a horizontal distance between a gravitational center of the body side and a support position at which the front side arch portion of the rear wheel house is supported by the third support member is larger than a horizontal distance between the gravitational center and the rear support position of the side sill lower portion.

12. A combination of a body side of an automotive vehicle and an transfer apparatus according to claim 10, wherein the second support member is elongated in the front-to-rear direction of the body side and has a curved abutment surface adapted to abuttingly engage with the rear pillar or the adjacent portion of the rear pillar of the body side.

13. A combination of a body side of an automotive vehicle and an transfer apparatus according to claim 12, wherein the second support member has the form of an L-shape and has a portion elongating in the front-to-rear direction of the body side and a portion elongating vertically.

14. A combination of a body side of an automotive vehicle and an transfer apparatus according to claim 10, wherein each of the first support members has a positioning recess in the form of a V-groove adapted to receive a sill flange of the body side.

15. A combination of a body side of an automotive vehicle and an transfer apparatus according to claim 10, wherein the third support member is axially elongated in a vehicle width direction.

16. A transfer method for transferring a body side of an automotive vehicle utilizing a transfer apparatus including a hanger having a plurality of support members adapted to support a side sill lower portion, a rear pillar or an adjacent portion of the rear pillar, and a front side arch portion of a rear wheel house of the body side, respectively, the method comprising:

hanging the body side on the hanger in a way as to allow a front-to-rear direction of the body side to coincide with a transfer directions;

positioning the body side vertically, in a vehicle width direction and in a front-to-rear direction of the body side, utiizing the support members to allow the body side to assume a posture declining toward a rear end of the body side and inclining inboard of the body side; and urging the body side by its own weight against the support members to support the body side on the support members.

* * * * *